United States Patent [19]

Konrad

[11] 3,927,357
[45] Dec. 16, 1975

[54] ELECTRIC VEHICLE POWER CIRCUIT
[75] Inventor: Charles Edward Konrad, Roanoke, Va.
[73] Assignee: General Electric Company, Salem, Va.
[22] Filed: Apr. 1, 1974
[21] Appl. No.: 456,466

[52] U.S. Cl.............................. 318/139; 318/341
[51] Int. Cl.².......................................... H02P 5/16
[58] Field of Search .......... 318/138, 139, 246, 341, 318/439

[56] References Cited
UNITED STATES PATENTS

| | | | |
|---|---|---|---|
| 3,492,557 | 1/1970 | Brown................................ | 318/341 |
| 3,624,475 | 11/1971 | Smith................................ | 318/341 |
| 3,803,472 | 4/1974 | Konrad.............................. | 318/341 |
| 3,826,959 | 7/1974 | Anderson........................... | 318/139 |

Primary Examiner—Robert K. Schaefer
Assistant Examiner—W. E. Duncanson, Jr.
Attorney, Agent, or Firm—W. C. Bernkopf; J. H. Beusse

[57] ABSTRACT

A power circuit for dc-to-dc pulse control or chopper systems. A pair of unidirectional conduction devices are each connected to a common end of a capacitor placed across a DC load, while a main thyristor is used to couple the load to a source of dc potential.

A first one of the unidirectional conduction devices allows current to flow to the capacitor through a path including an inductance. The inductance induces an overcharge upon the capacitor which is subsequently applied to the main thyristor by way of the second unidirectional conduction device to procure the commutation of the main thyristor.

9 Claims, 3 Drawing Figures

ELECTRIC VEHICLE POWER CIRCUIT

BACKGROUND OF THE INVENTION

The present invention relates to pulse control systems, and more particularly, to dc pulse control systems of the type utilizing a capacitor for periodically commutating a main switching thyristor.

The metering of dc power to a dc load in a continuously-variable fashion has long been a sought after desideratum. With one prior art approach, a plurality of resistances were inserted between a dc load and a source of dc potential, and the resistances selectively switched in or out of the circuit to vary the effective voltage applied to the load. Due to $I^2R$ losses in the resistors and the abrupt changes in applied power this approach, though simple, was inefficient. With the availability of the thyristor and more particularly the silicon controlled rectifier or SCR a new approach, termed pulse control, has become feasible.

Pulse controlled dc power sources operate a thyristor in the manner of a rapidly-actuated switch. By varying the average percentage of time that the thyristor is conductive, the average power applied to a load may be varied correspondingly. In order to provide smooth operation, it is necessary to operate the thyristor at an extremely high rate such that the inherent characteristics of the drive system, i.e., inductance, inertia, etc. serve to integrate or smooth the pulses of electrical power.

While an SCR may withstand substantial forward bias without becoming conductive, and has the ability to remain nonconductive prior to the application thereto of a gating pulse, once it becomes conductive it will continue to conduct until current therethrough is interrupted by means of an outside mechanism. That is, the SCR as presently known is a gate turn-on, but not a gate turn-off, device. For this reason in dc control systems separate circuitry must be provided in order to extinguish or commutate the SCR. It will be apparent that when used in ac systems, the natural reversal of potential occurring each cycle effects automatic commutation of the SCR.

DC commutation systems commonly make us of auxiliary SCR's and/or diodes to provide current paths which allow a capacitor to be charged from the power source. The natural inductance of the power source leads, or additional inductance inserted into the circuit in series with the capacitor, causes the voltage accruing upon the capacitor to "overshoot" so that it charges to some value above the source potential. The unidirectional conduction device utilized to charge the capacitor then becomes back-biased, and another current path is enabled which allows the charge accrued upon the capacitor to reverse. Here again, additional inductance may be provided in the circuit to aid the resonant reversal of the stored charge upon the capacitor. The reversed charge thus accrued upon the capacitor is subsequently applied to the main thyristor and provides a reverse bias thereacross to extinguish the current flow, and thus commutate the thyristor.

In most modern-day commutation systems the commutating capacitor is forward-charged while coupled in shunt with the main thyristor. After charge reversal, means are activated to couple the capacitor across the main thyristor to effect commutation. However, occasionally a main thyristor will "shoot through" and fail to commutate. In such a situation, the continued conduction of the main thyristor effectively shunts the charging circuit and thus frustrates further attempts at commutating the main thyristor.

In order to obviate this problem, circuits have been designed which monitor the activity of the main thyristor and automatically disable the main power circuit should the main thyristor remain conductive for an undue period of time. However, such circuits necessarily add expense and complexity to the system and further necessitate a temporary shutdown of the system to allow the capacitor to be recharged. It will therefore be appreciated that it would be desirable to provide a commutation circuit for a pulse control system which will continue to operate should a commutation failure of the main thyristor occur.

It is therefore an object of the present invention to provide an improved power circuit for a dc pulse control system.

It is a further object of the invention to provide a commutating circuit for a dc pulse control system which will not be disabled by prolonged conduction of a main thyristor.

It is another object of the invention to provide an improved commutation circuit for a dc pulse control system which is capable of repeatedly back-biasing a main thyristor despite the continued conductivity of the thyristor.

SUMMARY OF THE INVENTION

Briefly stated, in accordance with one aspect of the invention the foregoing objects are achieved by providing first and second unidirectional conducting means which are inversely poled, and coupled to a common side of a capacitor. The series combination of the capacitor and each of the unidirectional conducting means is connected in parallel with a dc load. A main thyristor is provided for coupling the load to a source of dc voltage, along with a gating control for repeatedly switching the thyristor into conduction to meter power to the load.

The capacitor is initially charged, by way of a first one of the unidirectional conducting means, to a voltage greater than that of the power supply. The net difference in potential is then applied across the main thyristor by way of the second unidirectional conducting means. In this manner the capacitor reverse-biases the main thyristor, extinguishing current flow therethrough. Should the main thyristor fail to commutate the capacitor may again be charged through the first unidirectional conducting means.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiments taken in conjunction with the accompanying drawings in which:

DESCRIPTION OF A PREFERRED EMBODIMENT

Figure 1:
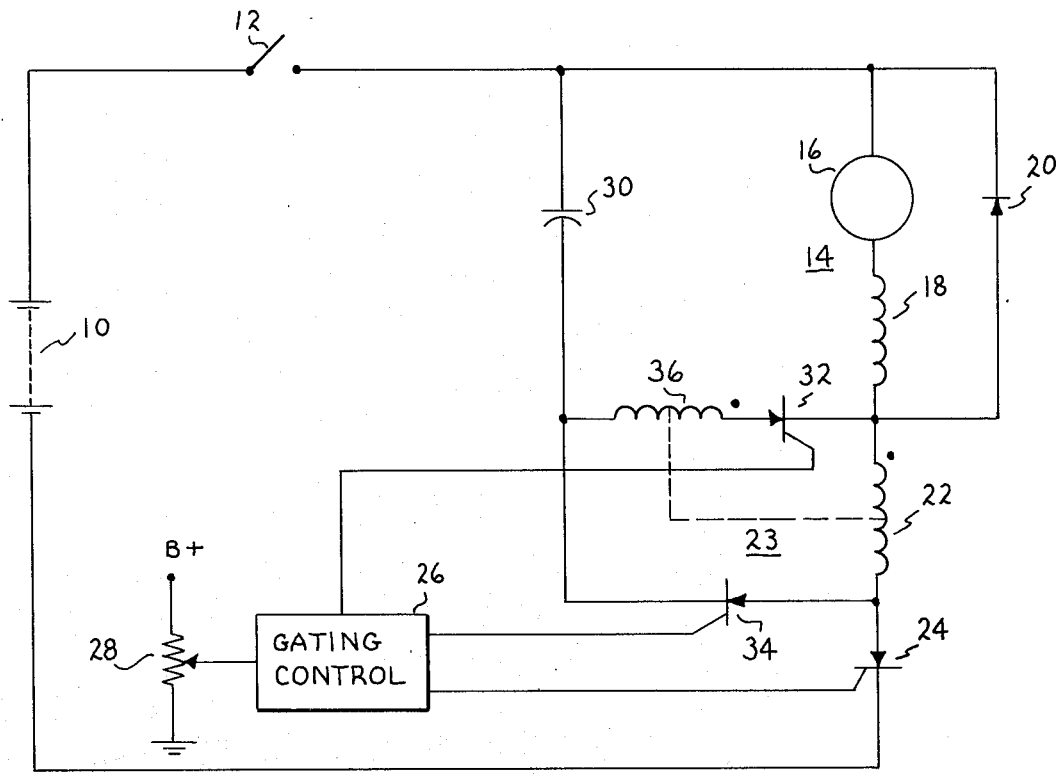
FIG. 1 is one embodiment of a pulse control circuit embodying principles of the present invention.

In FIG. 1 there are shown the principal elements of a switched regulating or pulse control system. A DC power source such as battery 10 provides current which flows through a master switch 13 to a dc motor 14. The motor depicted is one of the series type and comprises an armature 16 and field winding 18. While the load shown is a series-wound motor, it will be understood that the present invention is adaptable for use with various other dc loads. A flyback diode 20 is provided in shunt with motor 14, for purposes to be explained hereinafter.

The lower terminal of motor 14 is linked through the primary winding 22 of a transformer 23 and a main thyristor 24, herein shown as an SCR, to the lower terminal of battery 10. A gating control 26 supplies pulses for repetitively enabling thyristor 24 at a rate responsive to a control voltage derived from potentiometer 28, which may comprise a manually-adjustable speed control.

As is well known by those skilled in the art thyristors such as SCR 24 are not self-commutating, i.e., they will continue to conduct after cessation of an enabling signal at the gate thereof so long as current flow is maintained through the SCR. In order to extinguish or commutate the SCR, it is necessary to either interrupt current flow thereto or to reverse-bias the thyristor so that current flow is caused to cease. Accordingly, a commutating circuit is provided which includes a commutating capacitor 30, a first unidirectional conducting device 32, herein shown as an SCR, and a second unidirectional conducting device 34, also shown as an SCR. The secondary winding 36 of transformer 23 is advantageously coupled in series circuit relationship with capacitor 30 and SCR 32.

In order to apply power to motor 14 master switch 12 is closed, and a gating signal applied to SCR 24 from gating control 26. As is known to those skilled in the art gating control 26 may comprise one or more oscillators whose frequencies vary in response to an applied control signal. By gating SCR 24 on at a more rapid rate, or equivalently, by maintaining the rate of gating constant but delaying the activity of the commutating circuit the average conductive-to-nonconductive time of SCR 24, hereinafter referred to as the mark-space ratio, may be increased. The mark-space ratio of main SCR 24 then determines the percentage of available battery voltage which appears across the terminals of motor 14.

As main SCR 24 is gated on, or some time thereafter, gating control 26 also supplies a gating pulse to SCR 32. Secondary winding 36, SCR 32, primary winding 22 and SCR 24 now comprise a continuous charging circuit which allows charge from battery 10 to produce a positive-going voltage upon the upper plate of capacitor 30. At the same time additional current flows through load 14 and primary winding 22. Due in part to the action of transformer 23, charging current continues to flow even after the upper plate of capacitor 30 attains a voltage equal to that of battery 10. This effects an "overshoot" in capacitor voltage so that capacitor 30 attains a voltage level substantially in excess of battery 10.

As will be subsequently demonstrated, primary winding 22 of transformer 23 may be eliminated and secondary winding 36 replaced with an inductor to achieve the desired voltage overshoot upon capacitor 30.

When capacitor 30 has attained its maximum potential, the decay of energy in the inductive windings and the resulting tendency for resonant reversal of the charge back-biases and thus commutates SCR 32. However SCR 24 is unaffected by this activity and remains conductive, maintaining current flow through armature 16 and field winding 18 of motor 14.

It will now be appreciated that, except for a negligible resistive drop in the conductor coupling battery 10 to capacitor 30, the upper terminals of battery 10 and capacitor 30 are at substantially the same voltage. However, since the voltage to which capacitor 30 has been charged is substantially in excess of that of battery 10, the lower plate thereof will be at a negative potential with respect to the lower terminal of the battery. When gating control 26 then causes SCR 34 to become conductive the voltage then appearing at the anode of main SCR 24 will be substantially lower than the voltage appearing at the cathode thereof. This effectively reverse-biases main SCR 24 and extinguishes the flow of current therethrough. The natural tendency for charge accrued upon the upper plate of capacitor 30 to migrate to the lower plate thereof effects a resonant reversal of charge upon the capacitor. In this manner current flow from motor 14 is encouraged to flow to the lower plate 34 rather than through main SCR 24, effecting current starvation which further aids in the commutation of the main SCR.

The above-described activity effects the commutating of the main thyristor, subsequent to which the resonant reversal in charge of capacitor 30 continues until the inductive energy in the circuit loop is exhausted. Current flow through motor 14, however, continues due to the presence of flyback diode 20 which constitutes a short circuit path for current induced by the decay of inductive energy in the windings of the motor. Subsequently, depending upon the setting of potentiometer 28, gating control 26 applies another enabling pulse to the gate of main SCR 24 to re-institute the conduction/commutation process.

In some pulse control system applications aberrant conditions are encouraged which result in failures or inconsistent operation of certain portions of the circuit. For instance, one popular application of pulse control systems is for controlling the operation of an electric vehicle. In such an environment the operation of electrical accessories, the sudden opening and closing of switches in auxiliary circuits or even the close proximity of radio-frequency apparatus gives rise to abrupt discontinuities in the voltages appearing throughout the system. Such signals, commonly termed noise, are occasionally of sufficient magnitude to cause the improper operation of certain portions of the motor control circuit. For instance, should a sudden voltage spike appear upon a lead coupling gating control 26 to the gate terminals of one of the illustrated thyristors the thyristor might be enabled at an inopportune time. Should the discontinuity or noise be of sufficient magnitude, it could alternatively apply a sudden forward voltage across an otherwise non-conducting thyristor to cause the thyristor to go into conduction absent a gating signal. Although such improper operation is not necessarily detrimental to the successful operation of the circuit, in certain circumstances it could result in a loss of control. For instance, should it occur that due to improper gating of SCR 32 the initial voltage accrued across capacitor 30 is less than some minimum value, insufficient voltage would then be present to effect commutation of SCR 24.

In prior art systems it has been common for the commutating capacitor to be connected essentially in shunt with the main thyristor, by means of auxiliary thyristors. In such a circuit, should improper or insufficient commutation fail to extinguish the main thyristor a continuously-conducting path would then be presented across the capacitor, preventing the subsequent accrual of charge upon the capacitor and thwarting further attempts at commutation. In order to avoid the destruction of the main thyristor in such a case it is necessary to provide additional circuitry for sensing the commutation failure and disabling the power circuit.

With the present invention, however, sporadic failures in commutation of the main SCR 24 do not disable the commutating circuit, and the circuit can make repeated attempts to commutate the thyristor. For instance, should a transient voltage signal prematurely gate SCR 32, effecting a diminished initial charge upon capacitor 30 such that insufficient voltage is present to commutate SCR 24, SCR 24 will continue to conduct during the period when it is ordinarily extinguished. However, gating control 26 will continue to produce gating signals in accordance with the normal operation of the system. SCR 32 is subsequently enabled and capacitor 30 will again charge by way of inductor 36 and SCR 24 in exactly the same manner as before, regardless of the continued conduction of the main thyristor. When SCR 34 again conducts a negative potential will again be impressed upon the anode of main thyristor 24 in order to achieve commutation.

Rather than use a SCR for a unidirectional conducting device 34 it may in some applications be practical to utilize a diode. While in the above-described embodiment control over the time of conduction of SCR 34 by gating control 26 determined the time of commutation of main SCR 24, the natural resonance of the commutating circuit may alternatively be relied upon to produce properly-timed commutation.

Figure 2:
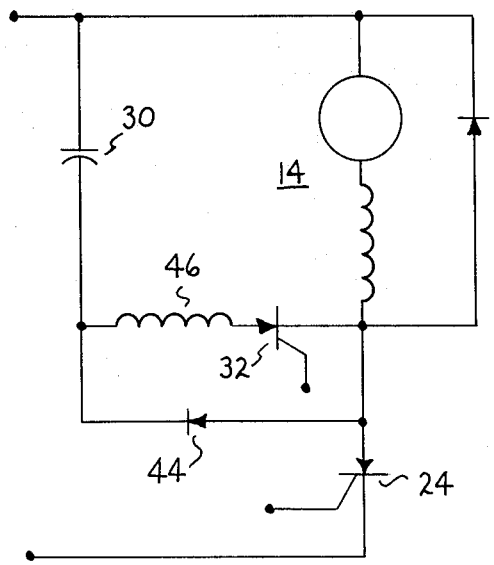
FIG. 2 is a portion of a pulse control circuit illustrating another embodiment of the invention.

Referring to FIG. 2, there is shown an alternative embodiment in which SCR 34 of FIG. 1 is replaced by a diode 44. In operation, when main switch (not shown) is first closed, SCR 32 is enabled so as to allow current to flow through capacitor 30, inductive winding 46, and SCR's 32 and 24. The properties of inductor 46 cause current flow to continue after capacitor 30 has been charged to the voltage of the source, producing the desired "overshoot" voltage upon the capacitor. While this could alternatively be accomplished by means of a transformer such as disclosed in FIG. 1, it will be recognized that a suitable inductor may alternatively be used as shown in the present embodiment.

Once capacitor 30 has achieved its "overshoot" voltage the collapse of magnetic flux about inductor 46 tend to cause a resonant reversal of charge. Since SCR 32 is unidirectional conducting means, the tendency toward charge reversal effects commutation of this element. Meanwhile, current flow through motor 14 continues by way of main SCR 24. The tendency toward resonant charge reversal of capacitor 30, however, forward-biases diode 44. Capacitor 30 and the voltage source (not shown) thus appear in series connection across SCR 24. Due to the opposing polarities of the voltage source and capacitor 30, and the fact that the voltage across capacitor 30 exceeds that of the source, the net difference in voltage is then impressed across main SCR 24 to reverse-bias the SCR and effect the commutation thereof.

It will be recognized by those skilled in the art that motor 14 is also coupled in shunt with capacitor 30 and diode 44. However, due to the inductive properties of the load, SCR 24 will be commutated before the additional charge on capacitor 30 is dissipated through the motor. It will therefore be seen that the point of commutation of SCR 24 may be controlled in the present instance by the proper gating of SCR 32.

Figure 3:
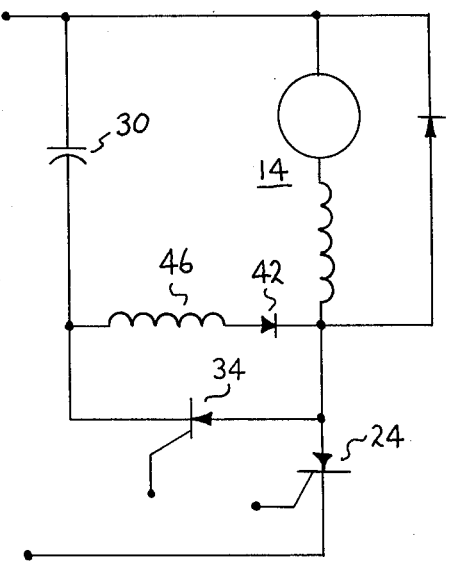
FIG. 3 is a portion of a pulse control circuit showing still another embodiment of the invention.

FIG. 3 shows still another embodiment of the present invention in which the "charging" SCR 32 is replaced by a diode 42, and the "commutating" SCR 34 of FIG. 1 is retained. In this embodiment, capacitor 30 charges by way of inductor 46, diode 42 and main SCR 24 as soon as power is applied to the circuit. The subsequent tendency toward resonant reversal of charge upon capacitor 30 back-biases diode 42 so that the accrued overshoot voltage upon capacitor 30 is effectively held until needed for commutation.

When it is decided to commutate main SCR 24, a gating control (not shown) fires commutating SCR 34, causing a net back-bias to be applied across SCR 24. In this manner, while the time of precharging of capacitor 30 is not controlled by the circuitry, the actual point of commutation of the main SCR is.

It will now be seen that with any of the foregoing embodiments, the "shootthrough" or failure to commutate of main SCR 24 will not prevent the commutating circuitry from re-charging capacitor 30 and subsequently applying the accrued reverse biasing potential across the main SCR again. This activity can be repeated indefinitely within the current-carrying limit of SCR 24 which may, of course, be exceeded by prolonged conduction of overly high currents.

As will be evidenced from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. A pulse control system for controlling the power applied to a dc load from a dc source, comprising:
    switching means for periodically coupling the dc load to the dc source, the mark-space ratio of conductivity of said switching means determining the percentage of source voltage which appears across the load;
    the series combination of a capacitor, inductive means and first unidirectional conducting means;
    means for coupling said series combination across the load;
    second unidirectional conducting means coupled in parallel with said inductive means and said first unidirectional conducting means, said first and said second unidirectional conducting means being poled inversely with respect to each other; and
    control means for sequentially enabling said switching means and at least one of said first or said second unidirectional conducting means.

2. The invention defined in claim 1, wherein said switching means is a gate controlled thyristor.

3. The invention defined in claim 2 wherein said first unidirectional conducting means comprises a gated thyristor, said thyristor being enabled by said control means to cause said capacitor to achieve a potential thereacross in excess of the potential of said dc source.

4. The invention defined in claim 2, wherein said second unidirectional conducting means comprises a gated thyristor, said thyristor being enabled by said control means to apply the net difference in potential between said capacitor and the dc source across said switching means to effect the commutation thereof.

5. The invention defined in claim 2 wherein both said first and said second unidirectional conducting means comprise gated controlled thyristors.

6. The invention defined in claim 2, further comprising a transformer having a primary winding coupled in series circuit relationship with said gate controlled thyristor, and wherein said inductive means comprises the secondary winding of said transformer.

7. The invention defined in claim 6 wherein said first unidirectional conducting means comprises a gated thyristor, said thyristor being enabled by said control means to cause said capacitor to achieve a potential thereacross in excess of the potential of said dc source.

8. The invention defined in claim 6, wherein said second unidirectional conducting means comprises a gated thyristor, said thyristor being enabled by said control means to apply the net difference in potential between said capacitor and the dc source across said switching means to effect the commutation thereof.

9. The invention defined in claim 6 wherein both said first and second unidirectional conducting means comprise gate controlled thyristors.

* * * * *